(12) United States Patent
Hsu et al.

(10) Patent No.: US 10,197,384 B1
(45) Date of Patent: Feb. 5, 2019

(54) WINDOW FRAME MEASURING METHOD

(71) Applicant: CHING FENG HOME FASHIONS CO., LTD., Fuxing Township, Changhua County (TW)

(72) Inventors: Chun-Jan Hsu, Fuxing Township, Changhua County (TW); Yen-Chun Huang, Fuxing Township, Changhua County (TW)

(73) Assignee: CHING FENG HOME FASHIONS CO., LTD., Changhua County (TW)

( * ) Notice: Subject to any disclaimer, the term of this patent is extended or adjusted under 35 U.S.C. 154(b) by 0 days.

(21) Appl. No.: 15/708,896

(22) Filed: Sep. 19, 2017

(30) Foreign Application Priority Data

Aug. 3, 2017 (TW) .............................. 106126287 A

(51) Int. Cl.
| | |
|---|---|
| *G01B 11/02* | (2006.01) |
| *G06T 7/62* | (2017.01) |
| *G06K 19/06* | (2006.01) |
| *G06F 3/0488* | (2013.01) |
| *G06K 7/14* | (2006.01) |
| *G06F 3/0484* | (2013.01) |

(52) U.S. Cl.
CPC ............ *G01B 11/02* (2013.01); *G06F 3/0488* (2013.01); *G06F 3/04845* (2013.01); *G06K 7/1417* (2013.01); *G06K 19/06037* (2013.01); *G06T 7/62* (2017.01)

(58) Field of Classification Search
CPC ........... G01B 11/02; G01B 11/05; G06T 7/62; G06F 3/04845; G06F 3/0488; G06K 7/1417; G06K 19/06037
See application file for complete search history.

(56) References Cited

U.S. PATENT DOCUMENTS

| 2008/0017328 A1 | 1/2008 | Huang | |
|---|---|---|---|
| 2012/0081317 A1* | 4/2012 | Sirpal | .................. G06F 1/1616 345/173 |

(Continued)

FOREIGN PATENT DOCUMENTS

| CN | 102213591 A | 4/2010 |
|---|---|---|
| TW | 201408989 A | 3/2014 |
| TW | 201623919 A | 7/2016 |

*Primary Examiner* — Ali Bayat
(74) *Attorney, Agent, or Firm* — Muncy, Geissler, Olds & Lowe, P.C.

(57) ABSTRACT

A window frame measuring method is provided and includes the steps of: providing a smart electronic device having a window frame measuring application; starting the window frame measuring application of the smart electronic device to allow the image capturing unit to capture a code and a window frame externally and generate a code data and a window frame graphic data, respectively, which are then transmitted to the window frame measuring application by the transmission unit; analyzing and comparing the code data and the window frame graphic data by the window frame measuring application so as to generate a measuring data corresponding to dimensions of the window frame and transmit the measuring data to the display unit for display. Therefore, the window frame measuring method not only enables a user to perform smart human-machine interface interaction but also enhances accuracy in measurement of actual dimensions of window frames.

20 Claims, 3 Drawing Sheets

(56) References Cited

U.S. PATENT DOCUMENTS

| | | | |
|---|---|---|---|
| 2016/0012611 A1* | 1/2016 | Wexler | G06T 7/62 |
| | | | 382/103 |
| 2016/0283102 A1* | 9/2016 | Chen | H04M 1/7253 |
| 2016/0291804 A1* | 10/2016 | Okabayashi | G06F 3/04845 |
| 2017/0052674 A1* | 2/2017 | Tokutake | G06F 3/04817 |

* cited by examiner

WINDOW FRAME MEASURING METHOD

BACKGROUND OF THE INVENTION

1. Technical Field

The present invention relates to measuring methods and, more particularly, to a window frame measuring method for use in measuring dimensions of window frames 2. Description of Related Art Before buying curtains to be hung in window frames at home, users usually measure dimensions of the window frames (including window frame inner diameters, window frame outer diameters, and window frame diagonal distances) with a measurement tool (including a caliper or a tape measure) and then go shopping for the right curtains according to the measurements.

As described above, the prior art requires the users to measure the dimensions of the window frames and then go shopping for the right curtains according to the measurements. However, if the users measure the dimensions of the window frames wrongly, curtains subsequently purchased from a retailer by the users according to the wrong measurements will not fit, and the users will have to return the curtains to the retailer for an exchange or refund. In view of the aforesaid drawbacks of the prior art, the aforesaid conventional process is time-consuming and laborious. Therefore, the present invention is aimed at enabling users to measure dimensions of window frames conveniently and enhancing accuracy in measurement of dimensions of window frames.

BRIEF SUMMARY OF THE INVENTION

In view of the aforesaid drawbacks of the prior art, the objective of the present invention is to provide a window frame measuring method whereby a user acquires a measuring data, determines whether a curtain to purchase fits or not, measures dimensions of window frames more conveniently than disclosed by the prior art, performs smart human-machine interface interaction, and enhances accuracy in measurement of the actual dimensions of the window frames.

In order to achieve the above and other objectives, the present invention provides a window frame measuring method, comprising the steps of:

S1: providing a smart electronic device having a microprocessing unit, a window frame measuring application, an image capturing unit, a transmission unit and a display unit, wherein the microprocessing unit of the smart electronic device executes the window frame measuring application and electrically connects with the image capturing unit, the transmission unit and the display unit;

S2: starting the window frame measuring application of the smart electronic device to allow the image capturing unit to capture a code and a window frame externally and generate a code data and a window frame graphic data, respectively, which are then transmitted to the window frame measuring application by the transmission unit;

S3: executing a first algorithmic logic by the window frame measuring application to perform analysis and computation of the code data so as to generate a scale data, and executing a second algorithmic logic by the window frame measuring application to perform analysis and computation of the window frame graphic data so as to generate a window frame size data; and S4: executing a third algorithmic logic by the window frame measuring application to perform analysis and computation in accordance with the scale data and the window frame size data, generate a measuring data corresponding to dimensions of the window frame, and transmit the measuring data to the display unit for display, thereby allowing a user to discern the dimensions of the window frame.

Preferably, in the step S4, the window frame measuring application has a fourth algorithmic logic for generating at least two virtual adjustment points to be displayed on the display unit, touched and adjustably moved by the user to a predetermined position so as to generate an adjustment data, and then the window frame measuring application analyzes and compares the adjustment data with the scale data and the window frame size data so as to generate a measuring data corresponding to the dimensions of the window frame and transmit the measuring data to the display unit for display.

Preferably, the smart electronic device has a memory unit electrically connected to the microprocessing unit, and the window frame measuring application accesses the code data, the window frame graphic data, the scale data, the window frame size data, the adjustment data and the measuring data through the memory unit.

DETAILED DESCRIPTION OF THE INVENTION

Figure 1:
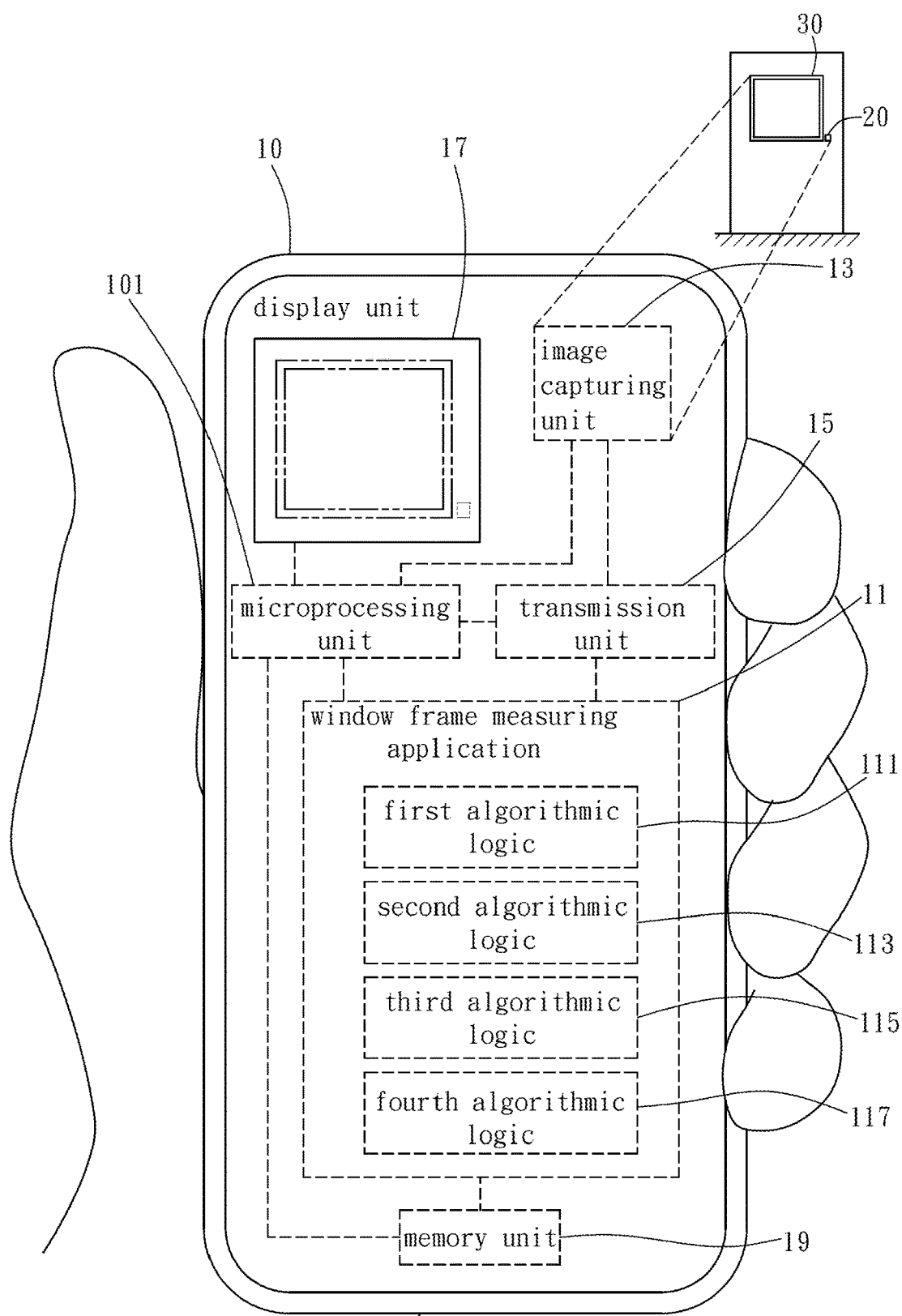
FIG. 1 is a schematic view of the framework of a window frame measuring method according to the first preferred embodiment of the present invention.

Structural features and expected advantages of the present invention are illustrated by preferred embodiments, depicted by accompanying drawings and described below. In the preferred embodiments and drawings, identical reference numerals denote identical or similar elements, components, objects, structures, systems, frameworks, devices, processes, methods or steps.

Figure 2:
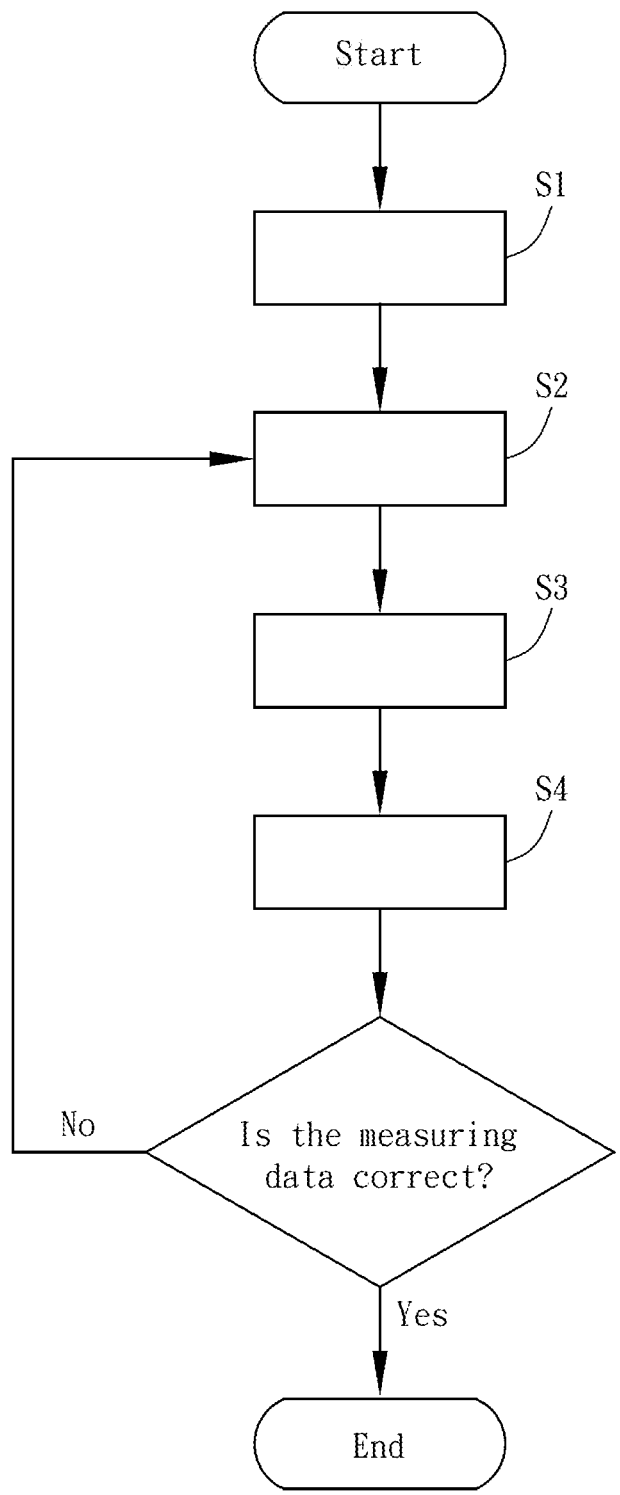
FIG. 2 is a flowchart of the window frame measuring method according to the first preferred embodiment of the present invention.

Referring to FIG. 1 and FIG. 2, a window frame measuring method provided according to the first preferred embodiment of the present invention comprises steps S1, S2, S3 and S4 as described below.

Step S1 involves providing a smart electronic device 10 which has a window frame measuring application 11, an image capturing unit 13, a transmission unit 15, a display unit 17 and a memory unit 19. Preferably, the window frame measuring application 11 comprises a first algorithmic logic 111, a second algorithmic logic 113, a third algorithmic logic 115 and a fourth algorithmic logic 117. The window frame measuring application 11 is executed by a built-in microprocessing unit 101 of the smart electronic device 10 and adapted to perform analysis and computation with the first algorithmic logic 111, the second algorithmic logic 113, the third algorithmic logic 115 and the fourth algorithmic logic 117. The microprocessing unit 101 of the smart electronic device 10 electrically connects with the image capturing unit 13, the transmission unit 15, the display unit 17 and the memory unit 19.

The smart electronic device 10 is a tablet, a smartphone or a smart worn device (such as a smart watch or a smart bracelet), which is not restrictive of claimed technical features and desired advantages of the present invention. The first algorithmic logic 111 comprises an algorithmic logic for analyzing and decoding a quick response code (QR code) data or a two-dimensional code data so as to generate a scale data (for example, 1:10/unit cm or 1:100/unit cm). The second algorithmic logic 113 comprises an algorithmic logic for analysis and computation of two-dimensional image recognition (including a two-dimensional window frame graphic data).

Step S2 involves starting the window frame measuring application 11 of the smart electronic device 10 to allow the image capturing unit 13 to capture a code 20 and a window frame 30 externally, so as to generate and transmit a code data (not shown) and a window frame graphic data (not shown) to the window frame measuring application 11 by the transmission unit 15.

Step S3 involves executing the first algorithmic logic 111 by the window frame measuring application 11 to perform analysis and computation of the code data (not shown) so as to generate a predetermined scale data (for example, 1:10/unit or 1:100/unit), and executing the second algorithmic logic 113 by the window frame measuring application 11 to perform analysis and computation of the window frame graphic data so as to generate a window frame size data.

Step S4 involves executing the third algorithmic logic 115 by the window frame measuring application 11 to perform analysis and computation in accordance with the scale data and the window frame size data. Preferably, the window frame measuring application 11 executes the fourth algorithmic logic 117 and thereby generates four virtual adjustment points (not shown) to be displayed on the display unit 17. Afterward, a user touches and adjustably moves the virtual adjustment points displayed on the display unit 17 to a predetermined position (including the upper left point, lower left point, upper right point and lower right point of the window frame size data) so as to generate an adjustment data (not shown). Afterward, the window frame measuring application 11 analyzes and compares the adjustment data with the scale data and the window frame size data so as to generate a measuring data (including data descriptive of the inner-frame length, the inner-frame width, the inner-frame diagonal distance, the outer-frame length, the outer-frame width and the outer-frame diagonal distance of the window frame 30) corresponding to actual dimensions of the window frame 30 and transmit the measuring data to the display unit 17 for display, thereby allowing the user to discern the dimensions of the window frame 30.

In a variant embodiment, the step S4 is followed by a determining step which involves determining whether the measuring data matches the dimensions of the window frame 30. If the determination is affirmative, the process flow of the window frame measuring method ends. If the determination is negative, the process flow of the window frame measuring method begins anew with the step S2.

In a variant embodiment, the window frame measuring application 11 executes the fourth algorithmic logic 117 and thereby generates the at least two virtual adjustment points to be displayed on the display unit 17, touched and adjustably moved by the user to a predetermined position (including the upper left point and lower right point or the upper right point and lower left point of the window frame size data) so as to generate an adjustment data (not shown). The smart electronic device 10 further has a built-in register (not shown) in which the window frame measuring application 11 stores the code data, the window frame graphic data, the scale data, the window frame size data, the adjustment data and the measuring data temporarily. Furthermore, the code data, the window frame graphic data, the scale data, the window frame size data, the adjustment data and the measuring data are stored in the memory unit 19 of the smart electronic device 10.

Advantages achieved by the present invention in the first preferred embodiment are described below.

First, to purchase the right curtain from a shop or a warehouse store, the user starts the window frame measuring application 11 of the smart electronic device 10 to capture with the image capturing unit 13 the code 20 displayed in the vicinity of the desired curtain or generate the code data and the window frame graphic data about the window frame 30 of the desired curtain so as for the code data and the window frame graphic data to be transmitted to the window frame measuring application 11 by the transmission unit 15. Afterward, the window frame measuring application 11 uses the first algorithmic logic 111 and the second algorithmic logic 113 to perform analysis and computation in accordance with the code data and the window frame graphic data, so as to generate the measuring data corresponding to the actual dimensions of the window frame 30 and transmit the measuring data to the display unit 17 for display. Therefore, the window frame measuring method provided according to the present invention enables the user to not only determine whether a curtain to purchase fits or not according to the measuring data but also measure dimensions of a window frame more conveniently than disclosed by the prior art.

Second, if the user subjectively believes that the measuring data obtained by the analysis and computation performed with the window frame measuring application 11 does not match the actual dimensions of the window frame 30 (which may be a polygonal window frame or a round window frame,) the user can execute the window frame measuring application 11 anew. Preferably, the user touches and adjustably moves the virtual adjustment points displayed on the display unit 17 to a predetermined position (including any virtual adjustment points other than the upper left point, lower left point, upper right point and lower right point, created in accordance with the window frame size data) so as to generate the adjustment data which the user approves of. At this point in time, the adjustment data is analyzed and compared with the scale data and the window frame size data by the window frame measuring application 11 so that the measuring data more precisely corresponding to the actual dimensions of the window frame 30 is generated. Therefore, the window frame measuring method not only enables the user to perform smart human-machine interface interaction but also enhances accuracy in measurement of the actual dimensions of window frames.

Third, with the smart electronic device 10 being provided with the built-in register (not shown), the window frame measuring application 11 stores the code data, the window frame graphic data, the scale data, the window frame size data, the adjustment data and the measuring data in the register temporarily, and the aforesaid data temporarily stored in the register is erased in a period of time or as soon as the user exits the window frame measuring application 11. Therefore, the aforesaid data does not take up the memory space of a built-in memory of the smart electronic device 10, thereby rendering it convenient for the user to apply the window frame measuring method of the present invention.

Figure 3:
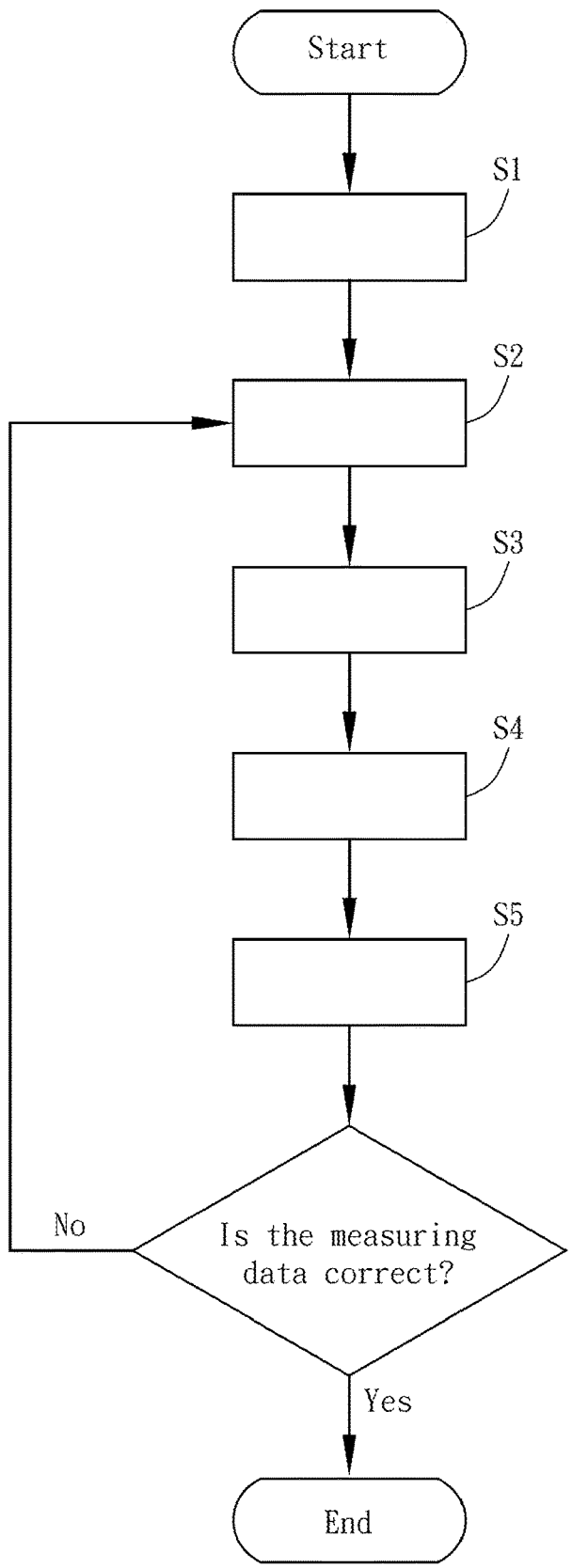
FIG. 3 is a flowchart of another window frame measuring method according to the second preferred embodiment of the present invention.

Referring to FIG. 3, there is shown a flowchart of another window frame measuring method according to the second preferred embodiment of the present invention. The description below explains how the second preferred embodiment of the present invention is distinguished from the first preferred embodiment of the present invention. The window frame measuring method according to the second preferred embodiment of the present invention comprises the steps below.

Step S1: providing a smart electronic device 10 which has a microprocessing unit 101 a window frame measuring application 11, an image capturing unit 13, a transmission unit 15, a display unit 17 and a memory unit 19, wherein the microprocessing unit 101 of the smart electronic device 10 executes the window frame measuring application 11 and electrically connects with the image capturing unit 13, the transmission unit 15, the display unit 17 and the memory unit 19.

Step S2: starting the window frame measuring application 11 of the smart electronic device 10 to allow the image capturing unit 13 to capture a code 20 externally and generate a code data which is then transmitted to the window frame measuring application 11 by the transmission unit 15.

Step S3: touching the display unit 17 of the smart electronic device 10 by a user to select a window frame graphic data pre-stored in the memory unit 19 and transmit the window frame graphic data to the window frame measuring application 11 by the transmission unit 15.

Step S4: executing a first algorithmic logic 111 by the window frame measuring application 11 to perform analysis and computation of the code data so as to generate a scale data, and executing a second algorithmic logic 113 by the window frame measuring application 11 to perform analysis and computation of the window frame graphic data so as to generate a window frame size data.

Step S5: executing a third algorithmic logic 115 by the window frame measuring application 11 to perform analysis and computation in accordance with the scale data and the window frame size data. Preferably, the window frame measuring application 11 executes the fourth algorithmic logic 117 to generate four virtual adjustment points to be displayed on the display unit 17, whereas the user touches and adjustably moves the virtual adjustment points displayed on the display unit 17 to a predetermined position (including the upper left point, lower left point, upper right point and lower right point of the window frame size data) so as to generate an adjustment data. Afterward, the window frame measuring application 11 analyzes and compares the adjustment data with the scale data and the window frame size data to generate, a measuring data (including data descriptive of the inner-frame length, the inner-frame width, the inner-frame diagonal distance, the outer-frame length, the outer-frame width and the outer-frame diagonal distance of the window frame 30) corresponding to the actual dimensions of the window frame 30 and then transmit the measuring data to the display unit 17 for display, thereby allowing the user to discern the dimensions of the window frame 30.

In a variant embodiment, the step S5 is followed by a determining step which involves determining whether the measuring data matches the dimensions of the window frame 30. If the determination is affirmative, the process flow of the window frame measuring method ends. If the determination is negative, the process flow of the window frame measuring method begins anew with the step S2.

An advantage of the second preferred embodiment of the present invention is as follows: asynchronous, instant window frame measurement, as describe below. The user performs the image capturing of the window frame 30 (which a curtain is to be hung in) by starting the image capturing unit 13 of the smart electronic device 10, so as to generate a window frame graphic data and transmit the window frame graphic data to the memory unit 19 for storage. Afterward, when the user is shopping for the right curtain in a shop or a warehouse store, the user starts the window frame measuring application 11 with the smart electronic device 10 and captures with the image capturing unit 13 the code 20 displayed in the vicinity of the desired curtain, so as to generate the code data. Then, the user touches the display unit 17 and selects the window frame graphic data stored in the memory unit 19. Afterward, the code data and the window frame graphic data are transmitted to the window frame measuring application 11 by the transmission unit 15. At this point in time, the window frame measuring application 11 uses the first algorithmic logic 111 and the second algorithmic logic 113 to analyze and compare the code data and the window frame graphic data, so as to generate the measuring data corresponding to the actual dimensions of the window frame 30 and transmit the measuring data to the display unit 17 for display. Therefore, the window frame measuring method of the present invention advantageously achieves asynchronous, instant window frame measurement.

Likewise, if the user believes that the measuring data obtained by the analysis and computation performed with the window frame measuring application 11 does not match the actual dimensions of the window frame 30, the user can execute the window frame measuring application 11. Preferably, the user touches and adjustably moves the virtual adjustment points displayed on the display unit 17 to a predetermined position (including any virtual adjustment points other than the upper left point, lower left point, upper right point and lower right point, created in accordance with the window frame size data) so as to generate the adjustment data which the user approves of. At this point in time, the adjustment data is analyzed and compared with the scale data and the window frame size data by the window frame measuring application 11 to generate the measuring data more precisely corresponding to the actual dimensions of the window frame 30.

Persons skilled in the art understand that the above detailed description and preferred embodiments of the present invention are illustrative of structures, methods, processes and desired advantages of the present invention rather than restrictive of the scope of the claims of the present invention, and that substitutions or changes made to any other equivalent elements, components, objects, structures, devices, methods or processes should fall within the scope of the present invention.

What is claimed is:

1. A window frame measuring method, comprising the steps of:

S1: providing a smart electronic device having a microprocessing unit, a window frame measuring application, an image capturing unit, a transmission unit and a display unit, wherein the microprocessing unit of the smart electronic device executes the window frame measuring application and electrically connects with the image capturing unit, the transmission unit and the display unit;

S2: starting the window frame measuring application of the smart electronic device to allow the image capturing unit to capture a code and a window frame externally and generate a code data and a window frame graphic data, respectively, which are then transmitted to the window frame measuring application by the transmission unit;

S3: executing a first algorithmic logic by the window frame measuring application to perform analysis and computation of the code data so as to generate a scale data, and executing a second algorithmic logic by the window frame measuring application to perform analysis and computation of the window frame graphic data so as to generate a window frame size data; and S4: executing a third algorithmic logic by the window frame measuring application to perform analysis and computation in accordance with the scale data and the window frame size data, generate a measuring data corresponding to dimensions of the window frame, and transmit the measuring data to the display unit for display, thereby allowing a user to discern the dimensions of the window frame.

2. The window frame measuring method of claim 1, wherein, in the step S4, the window frame measuring application has a fourth algorithmic logic for generating at least two virtual adjustment points to be displayed on the display unit, touched and adjustably moved by the user to a predetermined position so as to generate an adjustment data, and then the window frame measuring application analyzes and compares the adjustment data with the scale data and the window frame size data so as to generate a measuring data corresponding to the dimensions of the window frame and transmit the measuring data to the display unit for display.

3. The window frame measuring method of claim 2, wherein the smart electronic device has a memory unit electrically connected to the microprocessing unit, and the window frame measuring application accesses the code data, the window frame graphic data, the scale data, the window frame size data, the adjustment data and the measuring data through the memory unit.

4. The window frame measuring method of claim 1, wherein, if the measuring data does not match the dimensions of the window frame, the window frame measuring method begins anew with the S2 step.

5. The window frame measuring method of claim 1, wherein the code data is one of a quick response code (QR code) or a two-dimensional code data.

6. The window frame measuring method of claim 1, wherein the measuring data includes an inner-frame length, an inner-frame width, an inner-frame diagonal distance, an outer-frame length, an outer-frame width and an outer-frame diagonal distance of the window frame.

7. The window frame measuring method of claim 2, wherein, if the measuring data does not match the dimensions of the window frame, the window frame measuring method begins anew with the S2 step.

8. The window frame measuring method of claim 2, wherein the code data is one of a quick response code (QR code) or a two-dimensional code data.

9. The window frame measuring method of claim 2, wherein the measuring data includes an inner-frame length, an inner-frame width, an inner-frame diagonal distance, an outer-frame length, an outer-frame width and an outer-frame diagonal distance of the window frame.

10. The window frame measuring method of claim 3, wherein, if the measuring data does not match the dimensions of the window frame, the window frame measuring method begins anew with the S2 step.

11. The window frame measuring method of claim 3, wherein the code data is one of a quick response code (QR code) or a two-dimensional code data.

12. The window frame measuring method of claim 3, wherein the measuring data includes an inner-frame length, an inner-frame width, an inner-frame diagonal distance, an outer-frame length, an outer-frame width and an outer-frame diagonal distance of the window frame.

13. A window frame measuring method, comprising the steps of

S1: providing a smart electronic device having a microprocessing unit; a window frame measuring application, an image capturing unit a transmission unit a display unit and a memory unit, wherein the microprocessing unit of the smart electronic device executes the window frame measuring application and electrically connects with the image capturing unit, the transmission unit, the display unit and the memory unit;

S2: starting the window frame measuring application of the smart electronic device to allow the image capturing unit to capture a code externally and generate a code data which is then transmitted to the window frame measuring application by the transmission unit;

S3: touching the display unit by a user to select a window frame graphic data pre-stored in the memory unit and transmit the window frame graphic data to the window frame measuring application by the transmission unit;

S4: executing a first algorithmic logic by the window frame measuring application to perform analysis and computation of the code data so as to generate a scale data, and executing a second algorithmic logic by the window frame measuring application to perform analysis and computation of the window frame graphic data so as to generate a window frame size data; and S5: executing a third algorithmic logic by the window frame measuring application to perform analysis and computation in accordance with the scale data and the window frame size data, generate a measuring data corresponding to dimensions of a window frame, and transmit the measuring data to the display unit for display, thereby allowing the user to discern the dimensions of the window frame.

14. The window frame measuring method of claim 13, wherein, in the step S5, the window frame measuring application has a fourth algorithmic logic for generating at least two virtual adjustment points to be displayed on the display unit, touched and adjustably moved by the user to a predetermined position so as to generate an adjustment data, and then the window frame measuring application analyzes and compares the adjustment data with the scale data and the window frame size data so as to generate a measuring data corresponding to the dimensions of the window frame and transmit the measuring data to the display unit for display.

15. The window frame measuring method of claim 13, wherein, if the measuring data does not match the dimensions of the window frame, the window frame measuring method begins anew with the S2 step.

16. The window frame measuring method of claim 13, wherein the code data is one of a quick response code (QR code) or a two-dimensional code data.

17. The window frame measuring method of claim 13, wherein the measuring data includes an inner-frame length, an inner-frame width, an inner-frame diagonal distance, an outer-frame length, an outer-frame width and an outer-frame diagonal distance of the window frame.

18. The window frame measuring method of claim 14, wherein, if the measuring data does not match the dimensions of the window frame, the window frame measuring method begins anew with the S2 step.

19. The window frame measuring method of claim 14, wherein the code data is one of a quick response code (QR code) or a two-dimensional code data.

20. The window frame measuring method of claim 14, wherein the measuring data includes an inner-frame length, an inner-frame width, an inner-frame diagonal distance, an outer-frame length, an outer-frame width and an outer-frame diagonal distance of the window frame.

\* \* \* \* \*